United States Patent
Moore et al.

(10) Patent No.: US 11,118,873 B2
(45) Date of Patent: Sep. 14, 2021

(54) STROBED ILLUMINATORS (DAZZLER) WITH SYNCHRONIZED IMAGING OPTICS

(71) Applicant: Southwest Research Institute, San Antonio, TX (US)

(72) Inventors: Andrew R. Moore, San Antonio, TX (US); Omar D. Medjaouri, San Antonio, TX (US); Joseph N. Mitchell, San Antonio, TX (US); Trent Marshall Hejazi, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 16/380,764

(22) Filed: Apr. 10, 2019

(65) Prior Publication Data
US 2020/0326163 A1 Oct. 15, 2020

(51) Int. Cl.
*F41H 13/00* (2006.01)
*H04N 5/33* (2006.01)
*H04N 7/18* (2006.01)

(52) U.S. Cl.
CPC ..... *F41H 13/0087* (2013.01); *F41H 13/0056* (2013.01); *H04N 5/33* (2013.01); *H04N 7/185* (2013.01); *H04N 7/188* (2013.01)

(58) Field of Classification Search
CPC . F41H 13/0056; F41H 13/0087; H04N 7/188; H04N 5/2625
See application file for complete search history.

(56) References Cited

U.S. PATENT DOCUMENTS

| | | | | |
|---|---|---|---|---|
| 7,220,957 | B2* | 5/2007 | Choi | F41A 33/02 |
| | | | | 219/121.63 |
| 9,335,131 | B2* | 5/2016 | Devaux | F41H 13/0087 |
| 2005/0243224 | A1* | 11/2005 | Choi | F41H 13/0087 |
| | | | | 349/11 |
| 2010/0302282 | A1* | 12/2010 | Dobbie | H04N 7/183 |
| | | | | 345/666 |
| 2012/0314083 | A1* | 12/2012 | Ratliff | H04N 5/2251 |
| | | | | 348/164 |
| 2015/0233682 | A1* | 8/2015 | Devaux | F41H 13/0087 |
| | | | | 89/1.11 |
| 2016/0062148 | A1* | 3/2016 | Brudz | G02C 7/101 |
| | | | | 349/14 |
| 2017/0131067 | A1* | 5/2017 | Boland | G10K 11/178 |
| 2017/0202633 | A1* | 7/2017 | Liu | A61B 90/36 |
| 2018/0216919 | A1* | 8/2018 | Palti | F21V 29/70 |
| 2018/0224478 | A1* | 8/2018 | Bowers, III | G01P 3/40 |
| 2019/0248507 | A1* | 8/2019 | Fox | B64D 45/0015 |

* cited by examiner

*Primary Examiner* — Rowina J Cattungal
(74) *Attorney, Agent, or Firm* — Livingston Law Firm

(57) ABSTRACT

A dazzling system has at least one strobe illuminator and multiple imaging optics, which may be of various types. All strobe illuminators are synchronized to each other and the imaging optics are synchronized to all strobe illuminators. The imaging optics may be in-phase or out-of-phase. Various embodiments are possible depending on the application, but in all applications the strobe illuminator(s) disrupt the vision of unauthorized persons while allowing users of the system to view a scenario.

14 Claims, 4 Drawing Sheets

STROBED ILLUMINATORS (DAZZLER) WITH SYNCHRONIZED IMAGING OPTICS

TECHNICAL FIELD OF THE INVENTION

This invention relates to non-lethal weaponry, and more particularly to dazzlers and other optical devices that cause temporary disorientation.

BACKGROUND OF THE INVENTION

A "dazzler" is a non-lethal weapon that uses intense directed radiation to temporarily degrade or disrupt a target's ability to see. The dazzler's targets can include sensors, machine vision, or human vision. Dazzlers have traditionally been for military use, but there are also civilian applications such as for law enforcement and security.

Dazzlers emit visible or infrared light and are sometimes implemented with lasers. Most contemporary laser dazzlers operate in either the red (a laser diode) or green (a diode-pumped solid-state laser) areas of the electromagnetic spectrum. The green laser is chosen for its unique ability to react with the human eye and is less harmful to human eyes than other wavelengths.

The tactical effects of dazzlers fall into two main categories: bright light effects and strobe effects. Bright lights interfere with vision via flash blindness, glare, and after-image effects. Strobing lights break up the flow of dynamic visual information and overwhelm the adaptive mechanisms that naturally compensate for changing brightness conditions. Strobe-related dazzler effects may include disorientation, discomfort, distraction, and nausea.

A limitation on use of dazzlers is that the user is vulnerable to the strobe effects even if they are not subject to the bright light effects. Various countermeasures to dazzlers have been considered, such as narrowband optical filters tuned to the frequency of a laser dazzler.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to various systems of synchronized dazzlers and imaging devices, used during tactical scenarios to both enhance situational awareness of users and to disrupt the vision of others. A strobe illuminator (dazzler) produces a bright strobing light. Each user is equipped with an "imaging optic", which may be any one of various types of cameras, night vision devices, shuttered goggles, or other optical aids, synchronized to operate effectively in the presence of the dazzling strobe. As further explained below, an "imaging optic" can be either a device that uses a display screen or a visual aid that allows the user to view the scene directly.

In this manner, the system creates a dazzle effect on persons or sensors that are targets of the system (referred to herein as "opponents"). However, the system also allows its authorized users to view the same scene without experiencing the strobing dazzle effects.

Figure 1:
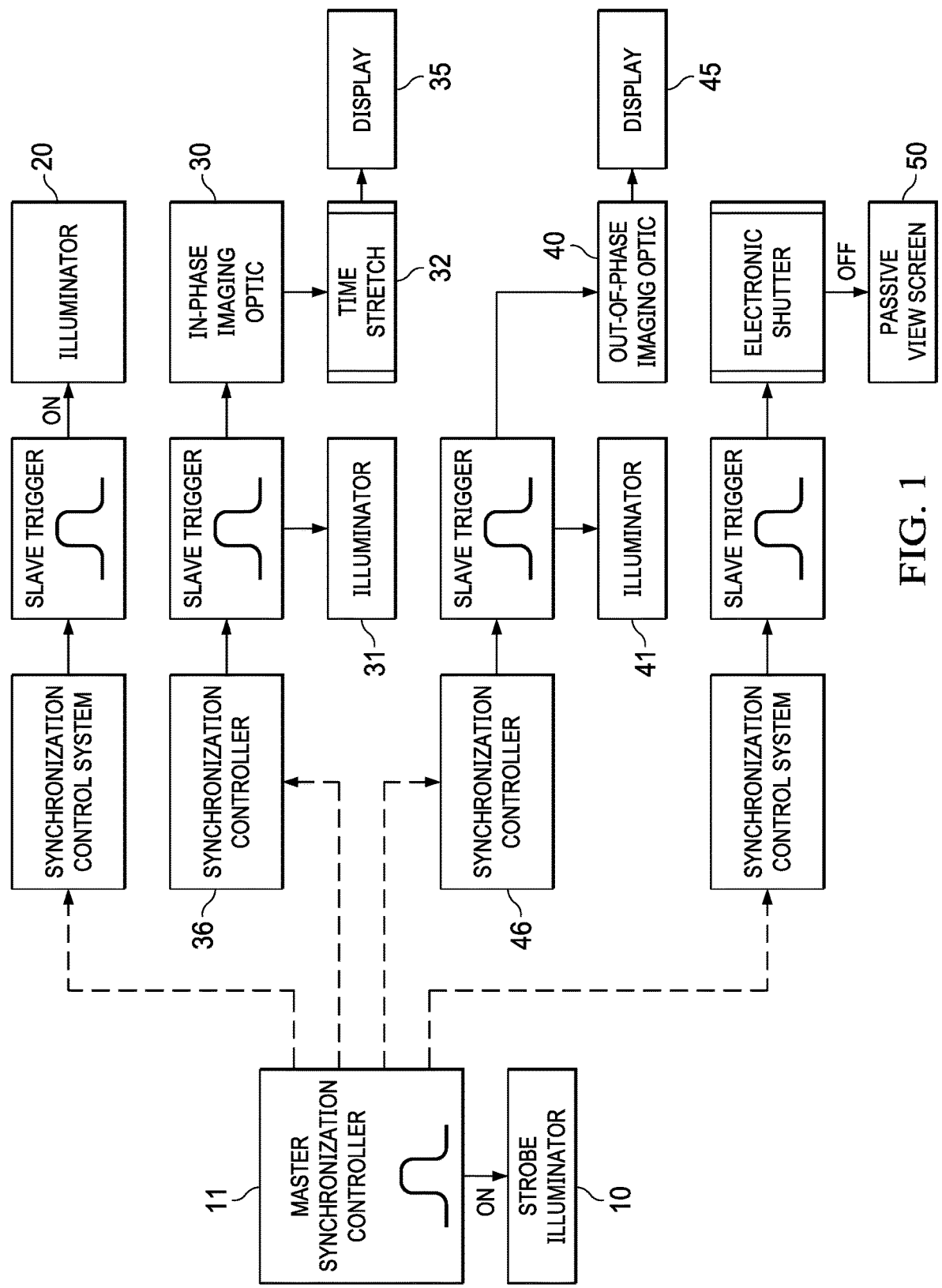
FIG. 1 illustrates a dazzler system having at least one dazzler and one or more imaging optics in accordance with the invention.

FIG. 1 illustrates a dazzler system having at least one strobe illuminator (dazzler) 10, which may or may not be a stand-alone device depending on the application. As explained below, system 100 also has at least one imaging optic 30 or 40, each having an associated synchronization controller 44. Various other illuminators and displays are optional, depending on the application.

Strobe illuminator 10 generates flashing light, which flashes repeatedly. The brightness and frequency of the strobe illuminator 10 is designed to produce a dazzling effect on human vision and/or machine vision, and optical sensors. A sequencer 11 determines the flash timing. The strobe frequency may be constant or varying.

A feature of system 100 is that it may comprise multiple imaging optics and/or additional illuminators. In the example of FIG. 1, system 100 comprises one additional illuminator 20, an in-phase imaging optic 30, an out-of-phase imaging optic 40, and a passive view screen 50. Additional illuminators 31 and 41, co-located with imaging optics may or may not be used to provide additional strobed or constant illumination of the scene. Other systems may have fewer than all of these devices. Furthermore, other systems may have multiples of any of these devices.

All imaging optics 30 and 40 are synchronized to strobe illuminator 10, which allows them to operate either "in-phase" or "out-of-phase" with strobe illuminator 10. In other words, each imaging optic synchronizes to the strobe light(s) such that each imaging optic acquires images either in-phase or out-of-phase with the activation of the strobe light. If there are multiple strobe illuminators, all strobe illuminators are synchronized to each other.

Each imaging optic 30 or 40 has an associated synchronization controller 36 or 46. Synchronization may be achieved using various synchronization methods. For example, system 100 may be networked, such that all devices receive synchronization signals from sequencer 11. If system 100 has a remote view screen, the network may be a data communications network that allows an imaging optic 30 or 40 to communicate imaging data (as a continuous video feed) to the remote view screen.

Alternatively, synchronization controller 36 or 46 can be configured to achieved synchronization in an open loop manner, with each imaging device having precise timing devices. Synchronization can also be achieved with GPS timing signals, with each synchronization controller 36 or 46 having a GPS receiver.

In-phase or out-of-phase operation of imaging optics 30 and 40 can be achieved using various techniques. Image acquisition can be turned on and off. The imaging optic 30 or 40 can be shuttered, mechanically or electronically. If the imaging optic 30 or 40 uses a mechanical shutter, synchronization controller 36 or 46 can be configured to actuate the shutter. Synchronization controller 36 or 46 allows the associated imaging optic to achieve in-phase or out-of-phase operation, in the manner explained below.

As explained below, as a result of synchronization, users of system 100 remain unaffected by the disruptive strobe effect of the primary illuminator 10. When system 100 is synchronized, an entire tactical team can each be equipped with an imaging optic 30 or 40 to view the scene effectively. Remote viewers can watch video feeds, sharp shooters can be positioned at a distance, and tactical robot operators and tactical entry personnel can be equipped with additional imaging optics and/or illuminators. However, when the scene is observed by an unauthorized person, imaging device, or sensor, the strobe illuminator 10 (and any additional strobe illuminators) disrupt normal vision or imaging.

The system 100 of FIG. 1 is a system having multiple illuminators, imaging optics, and displays, which are not necessarily co-located. In simpler embodiments, only a single user may use system 100, such as is the case with a head-mounted strobe illuminator with built-in imaging optics.

In-phase imaging optic 30 operates in-phase with strobe illuminator 10. It captures images of the scene when the strobe light is on. In-phase imaging optic 30 may be implemented with various conventional cameras, goggles or other devices that acquire images or enable vision in lighted environments.

Out-of-phase imaging optic 40 operates out of phase with strobe illuminator 10. It captures images of the scene when the light is off. An example of imaging optic 40 is a night-vision device, which may be any commercially available device that provides a night-vision-like capability to see in the dark. More specific examples are head-worn goggles or night vision rifle scopes. A camera capable of imaging without the aid of an active illuminator is treated as an out-of-phase imaging optic 40 for purposes of system 100.

Both in-phase imaging optic 30 and out-of-phase imaging optic 40 are referred to herein collectively as "imaging optics". Different tactical scenarios may call for different imaging optic implementations. These options include, without limitation, stationary versus mobile devices, head-mounted imaging optics, or imaging optics that provide a direct view versus a displayed view.

In some cases, additional illuminators, such as illuminator 20 may be used to provide light for an imaging optic. Illuminator 20 may operate independently of strobe illuminator 10. The need for illuminator 20 depends on low-light capabilities of the imaging optic(s) and the available ambient light. An example of use of illuminator 20 is with a night vision imaging optic that operates out-of-phase with strobe illuminator 10 but uses illuminator 20 for infrared illumination, constant or in-phase with the imaging optic.

Figure 2:
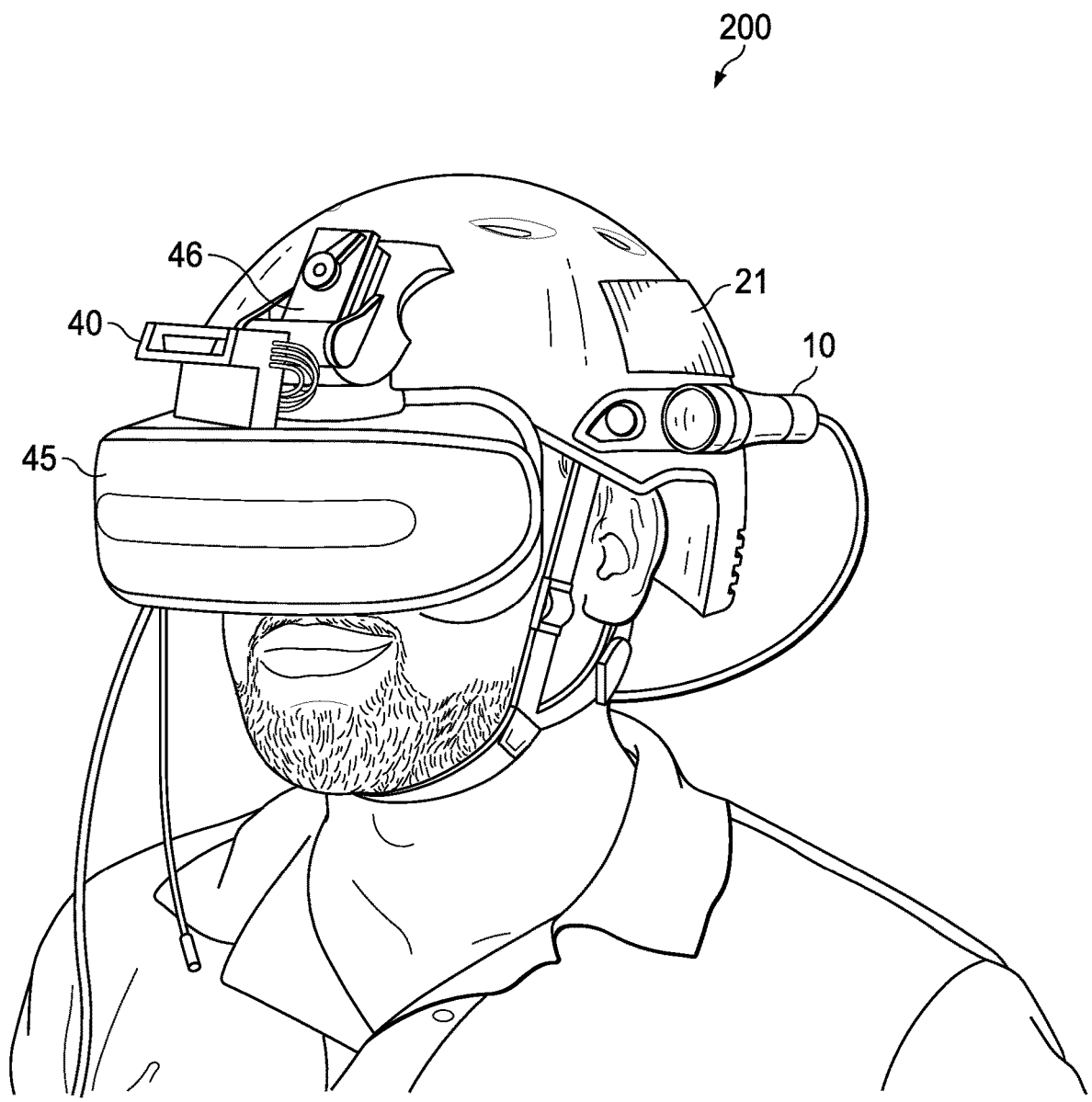
FIG. 2 illustrates a head-mounted embodiment of the dazzler system.

FIG. 2 illustrates an embodiment of system 100, implemented as a head-mounted system 200. A strobe illuminator 10, out-of-phase imaging optic 40, and associated synchronization controller 46 are mounted on a helmet 21. The imaging optic 40 is physically connected to display 45, and processed images are fed directly to the user via the display 45.

An example application of head-mounted system 200 is a tactical room clearing scenario in an unknown space. A typical imaging optic 40 is a night vision device.

In this embodiment, only a single illuminator is used, and is a strobe illuminator 10 on the helmet 21. In other embodiments the strobe illuminator 10 may be on a different person or placed in the environment.

When the imaging optic 40 is a night vision device 40, or other out-of-phase imaging optic, synchronization controller 46 ensures that the imaging optic 40 acquires images only when the strobe light is not actively emitting light so that the imaging optic's operation is not affected by the bright flashing light.

For many out-of-phase imaging optics 40, such as a night vision device, out-of-phase operation benefits the most from the strobe light being pulsed for very short, intense pulses. For example, with a 10 Hz periodicity, if the duty cycle were 5-10% (equating to a strobe on-time of 5-10 ms out of every 100 ms), then the imaging optic 40 functions normally 90-95% of the time. The 5% of the time that the imaging optic is not producing an image would manifest as an imperceptible flicker.

A de-facto standard for tactical night vision devices is the PVS-14. it is generally accepted that a trained user can effectively operate in the dark with a PVS-14 night vision goggle in most circumstances. Even though the PVS-14 provides a degraded visual capability when compared to the unaided eye in a daytime environment, this performance is acceptable.

Some out-of-phase imaging optics 40 may use more than one illuminator. An example is imaging optics that have near-infrared sensitivity. In this case the imaging optic is timed to block the dazzling pulses (out-of-phase imaging). A second illuminator 20 or 41 has a near-infrared strobe in-phase with the imaging optic's frame rate to provide illumination when the images are being acquired. As an alternative to strobing, the second illuminator 20 or 41 may provide constant illumination.

If an in-phase imaging optic 30 is to be used in the same environment, image acquisition is timed so that the imaging optic 30 acquires images at the same frequency as the strobe light (in-phase) so that the imaging optic 30 captures an illuminated picture. However, additional processing is needed to improve the framerate of the video constructed by the imaging optic 30. For example, if the strobe light operates at a frequency of 10 Hz, then the imaging optic 30 would only be able to construct a video at 10 frames per second. As explained below, "image stretching" is a possible technique that may be used to provide the user with an acceptable display. Other techniques might use machine learning or neural networks to interpolate information between frames and create the appearance of an image having a higher frame rate.

Whether the imaging optic is in-phase or out-of-phase with the strobe illuminator 10, a user who is viewing the environment through any of the associated displays 35, 45, or 50 (or directly through the imaging optic) is able to view the scene without experiencing the strobe effect and without being blinded by bright lights. Any person in the same scenario who is not using system 100 is negatively affected by the flashing illuminator.

Figure 3:
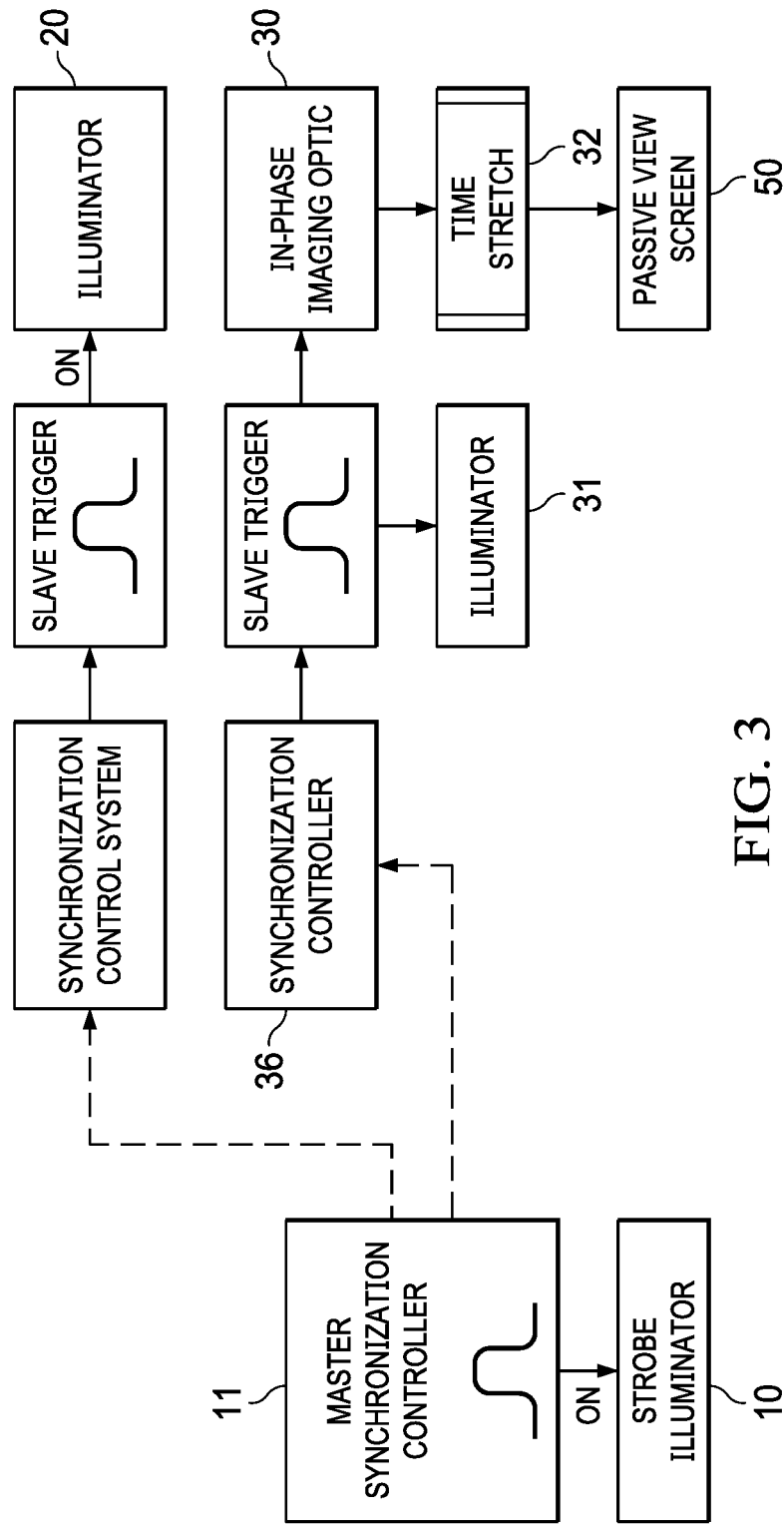
FIG. 3 illustrates an embodiment of the system that uses supplemental illumination and in-phase imaging optics.

FIG. 3 illustrates a second application example, which uses in-phase imaging optics 30 and is implemented as a fixed infrastructure security system. In an alarm condition, strobe lights from one or more strobe illuminators 10 are synchronized with one or more in-phase imaging optics 30 such that the cameras are not disrupted by the strobe effect. However, a person who is in the same physical space is affected. A display 50 is located wherever security cameras would be viewed from normally, which is likely be a different location than the camera(s) 30 and illuminator(s) 10. As stated elsewhere herein, in-phase imaging optic 30 may or may not use additional illuminators 20 or 31. A time stretch process 32 is explained below.

In a third example application, a tactical entry scenario occurs in a known environment such as a school, a shopping center, a bank, or an embassy. One or more strobe illuminators 10 are physically installed as infrastructure in the space. These strobe illuminators 10 are synchronized with a tactical goggle-imaging optic system. Out-of-phase imaging optics 30 are implemented as head-worn devices, e.g.

goggles. First responders wearing these goggles are unaffected by the strobe lights that are flashing throughout the building.

A fourth example application uses a strobe illuminator 10 and imaging optic 30 or 40 mounted to a tactical mobile robot. Display 50 is physically separated from the imaging optic and illuminator and is collocated with a robot operator who views images obtained by the robot. This implementation is similar to the infrastructure security system described above, but it is placed on a mobile platform rather than in a fixed location.

In a fifth example application, a strobe illuminator 10 is mounted to a tactical manned vehicle (for example, a riot control police vehicle), and the driver uses imaging optics 30 or 40 and a display to view the scene without being dazzled.

Figure 4:
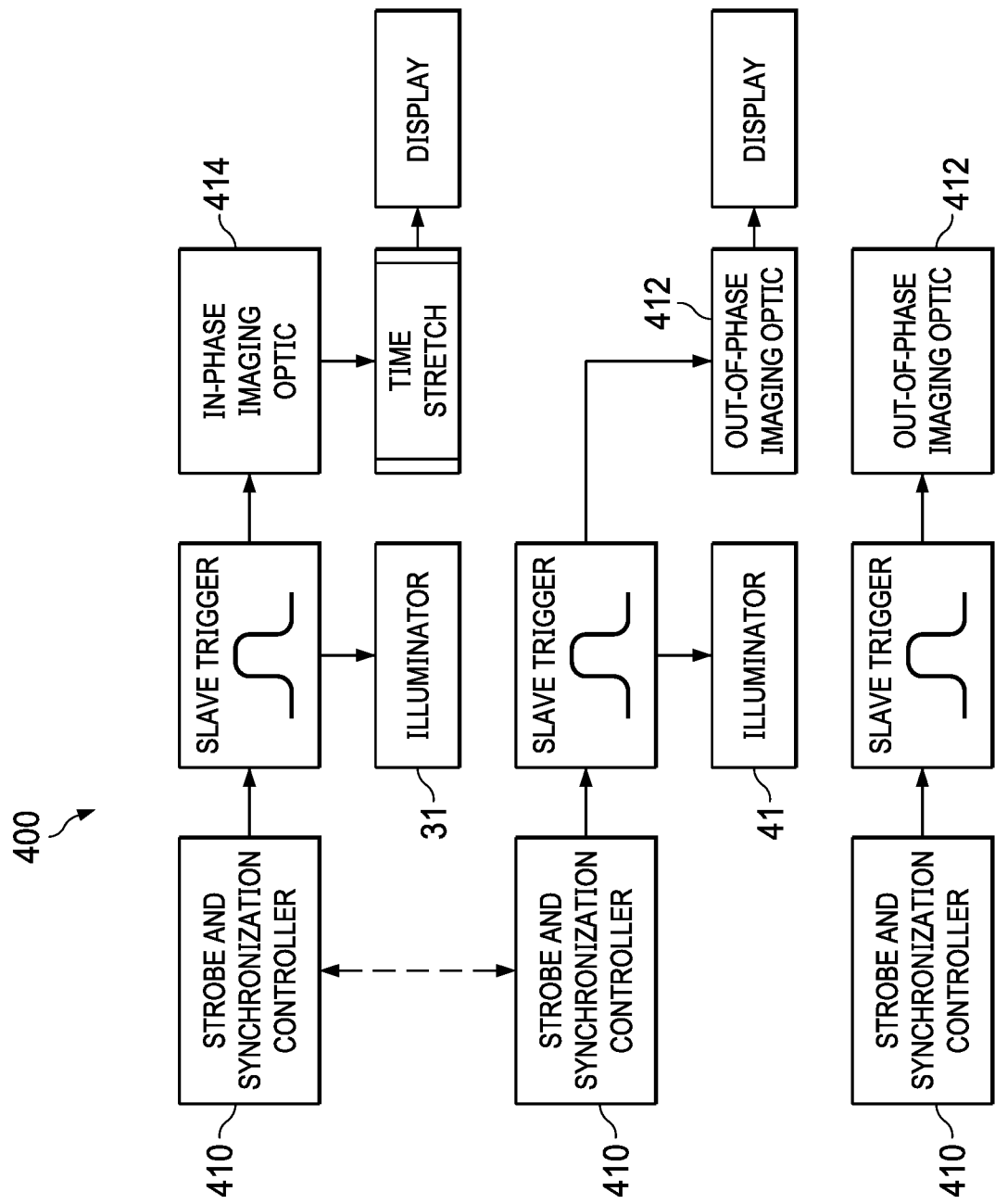
FIG. 4 illustrates an embodiment of the system that has a one-to-one ratio of strobe illuminators to users.

FIG. 4 illustrates an embodiment in which each user is equipped with a strobe illuminator 410 and an imaging optic, which may be either an out-of-phase or in-phase device. In the example of FIG. 4, system 400 has three users, two having an out-of-phase imaging optic 412 and one having an in-phase imaging optic 414.

In system 400 there is a one-to-one ratio of strobe illuminators 410 and users, that is, each user is equipped with his or her own strobe illuminator 410. An example of an application of system 400 is a SWAT team entering a property with a house or other building, day or night. The team members must be prevented from dazzling each other and must be equipped for different lighting scenarios.

Strobe illuminators 410 are in communication with each other so that they are synchronized to each other. In other words, the strobe lights are on or off at exactly the same time. The synchronization efforts may be distributed as shown or may come from a central synchronization hub such as the master controller of FIG. 1.

Furthermore, in the manner described above, all imaging optics are synchronized, either in-phase or out-of-phase, to the strobe illuminators 410. The imaging optics may be a display type or of a type that enables the user to view the scene directly with his or her own eyes.

Referring to both FIGS. 1 and 4, as stated above, an in-phase imaging optic 30 acquires images when strobe illuminator 10 and any additional strobe illuminators are on. However, in order for the strobe to be effective against non-users the "on" phases of illumination may be short and infrequent. When an image is only visible for a short time, it is difficult for a viewer to consciously absorb the information contained in the image. For this reason, display 35 is equipped with a time stretching process 32. Data processing devices of process 32 create image data that will display for longer than it was actually available to the naked eye. If the camera is illuminated for a short time period, but the collected image is displayed to the user for a longer period, the user of system 100 has more time to absorb information and interpret the scene.

What is claimed is:

1. A method of visually impairing an opponent in a scenario while allowing multiple users to view the scenario, comprising:
   placing one or more strobe illuminators within the scenario;
   operating each strobe illuminator at a predetermined frequency pattern and at a brightness sufficient to visually impair the opponent, thereby producing a dazzling illumination;
   wherein all strobe illuminators are synchronized to each other;
   placing one or more out-of-phase imaging optics within the scenario;
   wherein each out-of-phase imaging optic is synchronized out-of-phase with the strobe illuminator such that it does not acquire images or enable vision of the scenario during the dazzling illumination;
   placing one or more in-phase imaging optics within the scenario;
   wherein each in-phase imaging optic is synchronized in-phase with the strobe illuminator such that it acquires images or enables vision of the scenario only during the dazzling illumination; and
   processing the images acquired by the in-phase imaging optic to provide a frame rate greater than the in-phase strobe rate.

2. The method of claim 1, wherein the imaging optic is one or more of the following: camera, optical sensor, night vision goggles or imager, shuttered goggles, or imager.

3. The method of claim 1 wherein the strobe illuminator and the out-of-phase imaging optic are head-mounted.

4. The method of claim 1 further comprising using a secondary illuminator to provide illumination for the out-of-phase imaging optic.

5. The method of claim 4 wherein the out-of-phase imaging optic is a night vision device and the secondary illuminator is a near infrared illuminator.

6. The method of claim 4 wherein the secondary illuminator provides constant illumination.

7. The method of claim 4 wherein the secondary illuminator provides illumination in-phase with the imaging optic.

8. The method of claim 1 wherein the synchronizing step is performed with a GPS signal, a network, or by open-loop synchronization.

9. The method of claim 1, wherein at least one of the users is a non-human user.

10. The method of claim 1, wherein the processing step is performed with a time-stretching process.

11. A system for visually impairing an opponent in a scenario while allowing multiple users to view the scenario, comprising:
    one or more strobe illuminators operable to illuminate the scene with strobe illumination having a predetermined strobe pattern and brightness sufficient to visually impair the opponent, thereby producing a dazzling illumination;
    at least one out-of-phase imaging optic;
    at least one in-phase imaging optic;
    a synchronization controller associated with each out-of-phase imaging optic and each in-phase imaging optic;
    wherein each synchronization controller associated with an out-of-phase imaging optic is operable to control the out-of-phase imaging optic such that the out-of-phase imaging optic does not acquire images or enable vision of the scene during the dazzling illumination;
    wherein each synchronization controller associated with an in-phase imaging optic is operable to control the in-phase imaging optic such that the in-phase imaging optic acquires images or enables vision of the scene only during the dazzling illumination; and
    wherein each in-phase imaging optic has a process to process images acquired by the in-phase imaging optic to produce images at a frame rate acceptable to the human eye.

12. The system of claim 11 wherein the out-of-phase imaging optic is a night vision device.

13. The system of claim 12, further comprising a supplemental illuminator to provide in-phase or constant illumination for the imaging optic.

14. The system of claim 11, wherein the synchronization controller operates by receiving a timing signal from GPS, by receiving a timing signal via a network, or with open loop timing control.

\* \* \* \* \*